US012213927B2

(12) United States Patent
Halloran

(10) Patent No.: US 12,213,927 B2
(45) Date of Patent: Feb. 4, 2025

(54) TRANSFER SEAT PLATFORM

(71) Applicant: Loren Halloran, Powell River (CA)

(72) Inventor: Loren Halloran, Powell River (CA)

( * ) Notice: Subject to any disclaimer, the term of this patent is extended or adjusted under 35 U.S.C. 154(b) by 0 days.

(21) Appl. No.: 18/642,068

(22) Filed: Apr. 22, 2024

(65) Prior Publication Data

US 2024/0350344 A1 Oct. 24, 2024

Related U.S. Application Data

(60) Provisional application No. 63/460,935, filed on Apr. 21, 2023.

(51) Int. Cl.
*A61G 7/10* (2006.01)
*A47C 4/22* (2006.01)
*A47C 7/02* (2006.01)

(52) U.S. Cl.
CPC .............. *A61G 7/1001* (2013.01); *A47C 4/22* (2013.01); *A61G 7/1059* (2013.01); *A61G 7/1074* (2013.01); *A47C 7/021* (2013.01)

(58) Field of Classification Search
CPC .... A61G 7/1001; A61G 7/103; A61G 7/1025; A61G 7/1059; A61G 7/1074; A61G 7/021; A61G 3/02; A61G 3/06; A61G 3/062; A61G 5/14; A47C 4/22; B60N 2/245; B60N 5/00
USPC .................... 414/812, 921; 5/81.1 R; 108/44
See application file for complete search history.

(56) References Cited

U.S. PATENT DOCUMENTS 1,635,575 A * 7/1927 Cole ...................... A61G 7/103 5/81.1 HS
2,596,055 A * 5/1952 Thomas ................... A61G 5/14 482/68
3,341,864 A * 9/1967 Wichmann ........... A61G 5/1002 4/144.1
3,469,880 A * 9/1969 Woodward ............ B60N 2/245 296/65.01
3,709,159 A * 1/1973 Oglesby, Jr. ......... A47B 3/0912 108/132
3,758,894 A * 9/1973 Finley .................... A47K 3/122 4/546
4,278,387 A * 7/1981 Seguela .................. A61G 3/06 280/638
4,288,124 A * 9/1981 Hamilton ................. A61G 3/06 5/81.1 R
4,365,924 A * 12/1982 Brigman .................. A61G 3/06 414/921
4,457,663 A * 7/1984 Hems ....................... A61G 3/06 414/539

(Continued)

*Primary Examiner* — David R Hare
(74) *Attorney, Agent, or Firm* — Boudwin Intellectual Property Law, LLC

(57) ABSTRACT

A transfer seat platform that helps transfer a handicapped person from a wheelchair into a vehicle. The transfer seat platform includes a stand portion having a top portion with a bottom portion, a pair of front legs, and an extended lip, the top portion includes a front end and a back end, the pair of front legs extend from the front end of the top portion of the stand portion and the extended lip extends from the bottom portion of the top portion, and a cushion is disposed and coupled directly on the top portion. The pair of front legs have an adjustable length via a locking assembly. The pair of front legs are placed on a ground surface and the extended lip is placed within a vehicle doorframe.

18 Claims, 6 Drawing Sheets

(56) References Cited

U.S. PATENT DOCUMENTS 4,479,752 A * 10/1984 Todd .................... A61G 3/0209 414/921
4,494,465 A * 1/1985 Fick, Jr. ................. A47B 3/083 108/131
5,058,221 A * 10/1991 Abraham ............. A61G 7/1046 5/81.1 HS
5,207,549 A * 5/1993 Riva ........................ A61G 3/02 414/744.2
5,435,614 A * 7/1995 Nordberg ................. A61G 3/06 296/65.01
5,746,465 A 5/1998 Jones et al.
6,129,403 A * 10/2000 Townsend .............. B60N 2/245 296/65.01
6,256,806 B1 * 7/2001 DiTommaso ........ A61G 7/1003 4/578.1
6,508,319 B1 * 1/2003 Langenfeld .............. A61G 3/06 180/7.1
6,510,567 B1 * 1/2003 Robbins ................... A61G 5/08 5/81.1 R
6,533,523 B2 * 3/2003 Zamotin .............. A61G 7/1071 414/921
6,681,415 B1 * 1/2004 Gallo ..................... A47K 3/122 4/578.1
6,748,612 B1 * 6/2004 Cerne .................... A61G 7/103 5/81.1 R
7,651,313 B1 1/2010 Egan
7,866,723 B2 * 1/2011 Ninio ..................... B60N 2/245 297/344.11
8,398,356 B2 * 3/2013 Sandoz ................ A61G 3/0808 414/921
8,990,976 B1 * 3/2015 Saccone ............... A61G 7/1074 296/65.01
9,463,121 B1 * 10/2016 Maeshiro ................. B60N 2/06
10,758,433 B2 * 9/2020 Aitchison ................ B60N 2/14
11,071,664 B2 * 7/2021 Tu ........................ A61G 7/1025
11,857,472 B2 * 1/2024 Iwase ................... A61G 3/0808
2011/0280700 A1 11/2011 Uttech et al.
2012/0013102 A1 * 1/2012 Gao ....................... A61G 3/063 280/304.1
2014/0261587 A1 * 9/2014 Price ........................ A61H 3/00 135/65

* cited by examiner

TRANSFER SEAT PLATFORM

CROSS REFERENCE TO RELATED APPLICATIONS

This application claims the benefit of U.S. Provisional Application No. 63/460,935 filed on Apr. 21, 2023. The above identified patent application is herein incorporated by reference in its entirety to provide continuity of disclosure.

BACKGROUND OF THE INVENTION

The present invention relates to a platform. More specifically, the present invention relates to a transfer seat platform.

Many people are caregivers for individuals with limited mobility. When transporting an individual with limited mobility, helping them into a vehicle may be a difficult process. A caregiver may be put at risk of back injuries due to the need to balance their own body weight along with the other individual's body weight while assisting them into a vehicle. There is also an increased risk of injury to the individual with limited mobility if the caregiver experiences a muscle spasm or trips and falls while assisting them into a vehicle.

Injuries such as back pain, spasms and other chronic back problems can lead to lost wages, time and money for everyone.

There are currently other products available on the market for assisting individuals with limited mobility into a vehicle. However, those units are cumbersome and often require an electrical power source to operate. Therefore, there is a defined need amongst the known prior art for a transfer seat platform that is lightweight, adjustable, and collapsible making the process of helping an individual with limited mobility into a vehicle a safer and easier process.

In view of the above concerns, it is therefore desirable to provide a transfer seat platform that helps transfer a handicapped person from a wheelchair into a vehicle. The transfer seat platform helps transfer a handicapped person from a wheelchair into a vehicle without having to lift the handicapped person and physically place them into the vehicle.

SUMMARY OF THE INVENTION

In view of the foregoing disadvantages inherent in the known types of transfer seat platform now present in the prior art, the present invention provides a transfer seat platform wherein the same may be utilized to transfer a handicapped person from a wheelchair into a vehicle without having to lift the handicapped person and physically place them into the vehicle.

The present system comprises a transfer seat platform including a stand portion having a top portion, a pair of front legs, and an extended lip, the top portion includes a front end, a back end, and a bottom portion, the pair of front legs extend from the front end of the top portion of the stand portion and the extended lip extends from the back end of the top portion of the stand portion, and a cushion disposed and coupled directly on the top portion.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
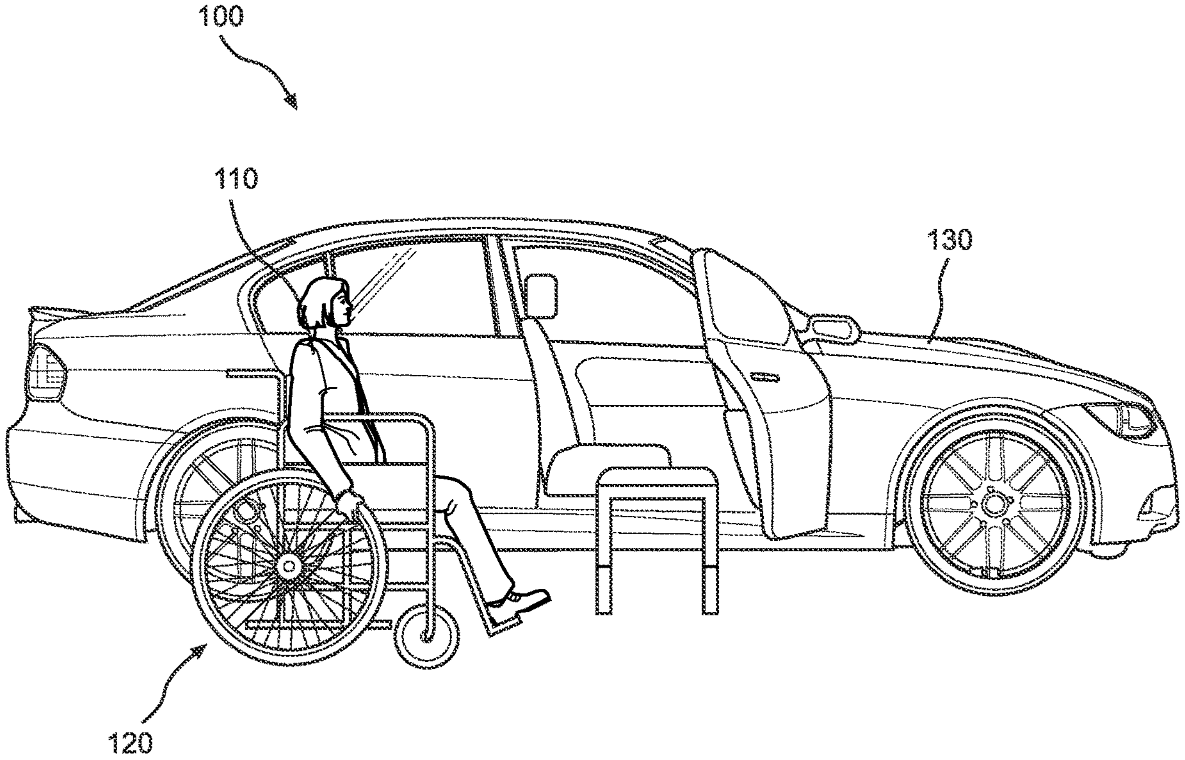
FIG. 1 shows a side environmental perspective view of an embodiment of a transfer seat platform.

Reference is made herein to the attached drawings. Like reference numerals are used throughout the drawings to depict like or similar elements of a transfer seat platform. The figures are intended for representative purposes only and should not be considered to be limiting in any respect.

FIG. 1 shows a side environmental perspective view of an embodiment of a transfer seat platform 100.

The transfer seat platform 100 may be utilized by a handicapped person 110 utilizing a wheelchair 120 and a vehicle 130 without having to lift the handicapped person 110 and physically place them into the vehicle 130.

In FIG. 1, the vehicle 130 is an automobile or the like and the transfer seat platform 100 may be positioned between the vehicle 130 and the wheelchair 120. The handicapped person 110 may lift themselves from the wheelchair 120 onto the transfer seat platform 100 and then may lift themselves from the transfer seat platform 100 and into the vehicle 130. The handicapped person 110 may also receive assistance from one or more other persons to lift themselves from the wheelchair 120 onto the transfer seat platform 100 and then may lift themselves from the transfer seat platform 100 or have assistance moving legs into the vehicle 130.

In FIG. 1, the handicapped person 110 may lift themselves from the wheelchair 120 onto the transfer seat platform 100 and then may lift themselves from the transfer seat platform 100 and into a passenger-side of the vehicle 130 or the like.

Figure 2:
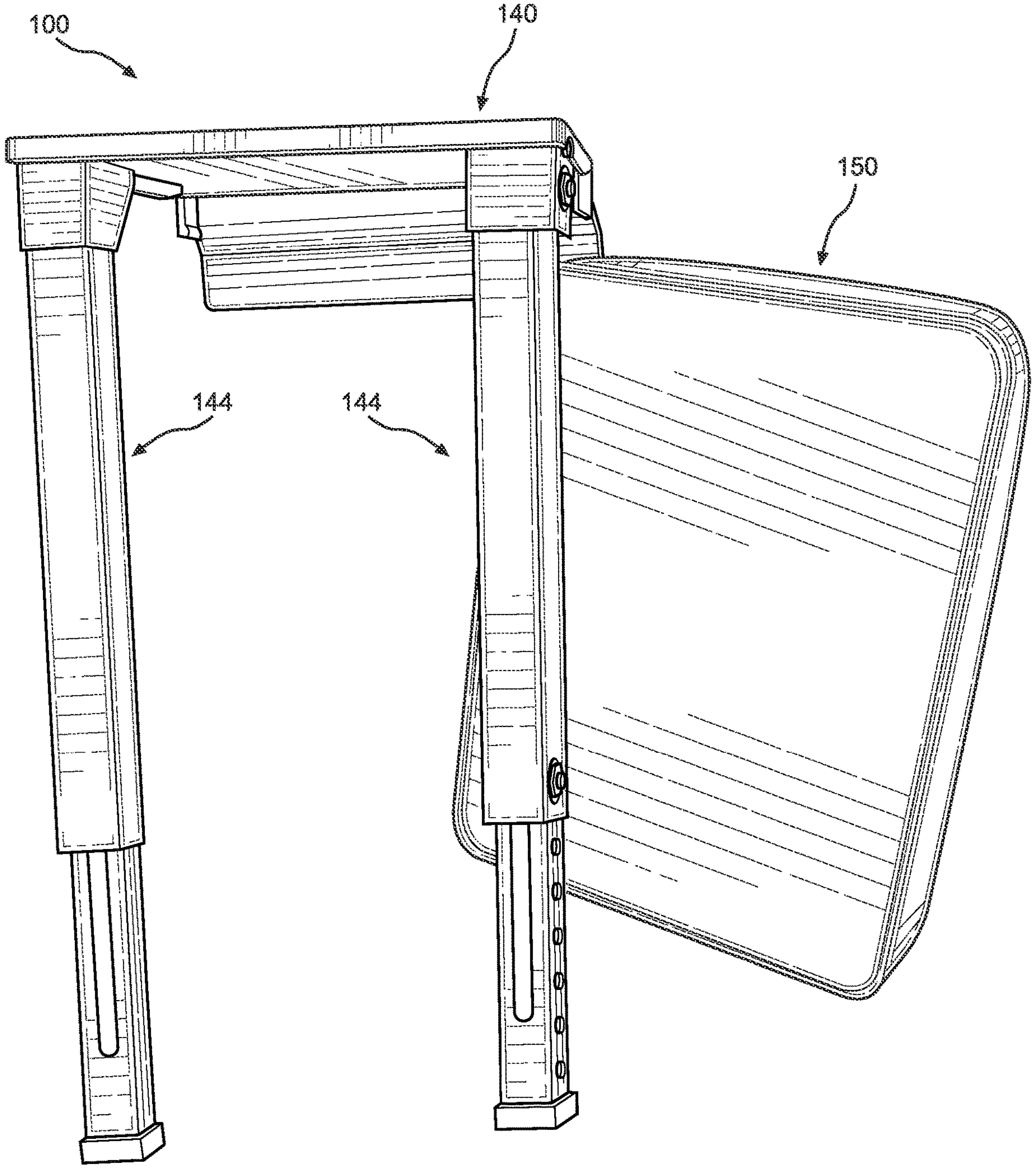
FIG. 2 shows a front exploded perspective view of an embodiment of a transfer seat platform.

FIG. 2 shows a front exploded perspective view of an embodiment of a transfer seat platform 100.

The transfer seat platform 100 may include a stand portion 140 and a cushion 150.

As shown in FIG. 2, the stand portion 140 may be separated from the cushion 150.

The stand portion 140 may be made of aluminum or the like. The cushion 150 may be made of leather or vinyl or the like.

Figure 3:
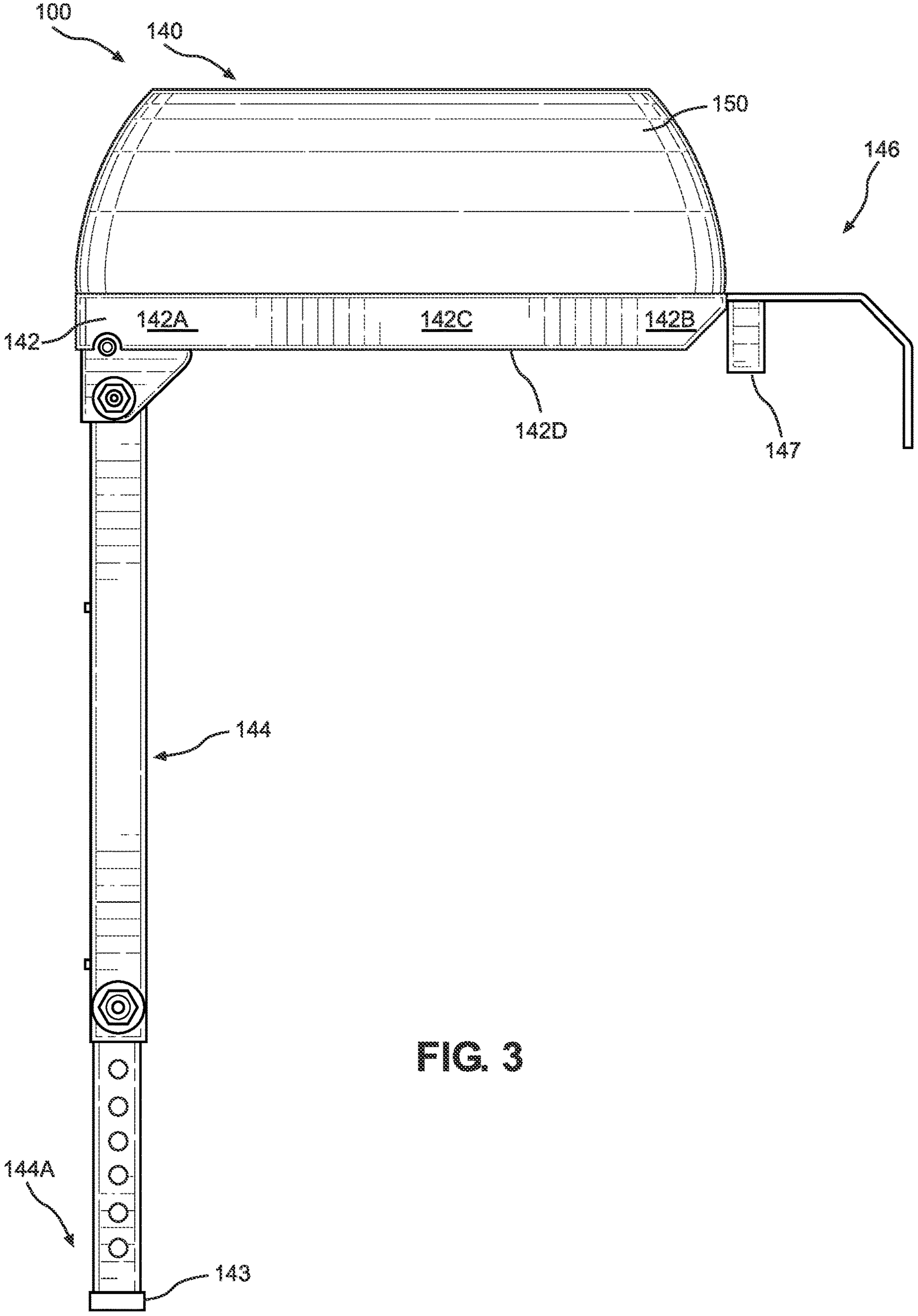
FIG. 3 shows a side perspective view of an embodiment of a transfer seat platform.

FIG. 3 shows a front perspective view of an embodiment of a transfer seat platform 100.

The stand portion 140 may include a top portion 142, a pair of front legs 144, and an extended lip 146.

The top portion 142 may include a front end 142A, a back end 142B, and a bottom 142D. The top portion 142 may be a flat planar surface 142C or the like. The cushion 150 may be disposed and coupled directly on the top portion 142.

The pair of front legs 144 may extend from the front end 142A of the top portion 142 of the stand portion 140. The pair of front legs 144 may be selectively adjustable in length to be compatible with vehicles of different sizes. The pair of front legs 144 may include a rubber foot 143 disposed on a distal end 144A of each of the pair of front legs 144 to prevent slippage.

The extended lip 146 may extend outward and downward from the bottom portion 142D of the top portion 142 of the stand portion 140. The extended lip 146 may include a downward vertical guide 147 directly adjacent to the top portion 142 of the stand portion 140 to guide the extended lip 146 in place.

Figure 4:
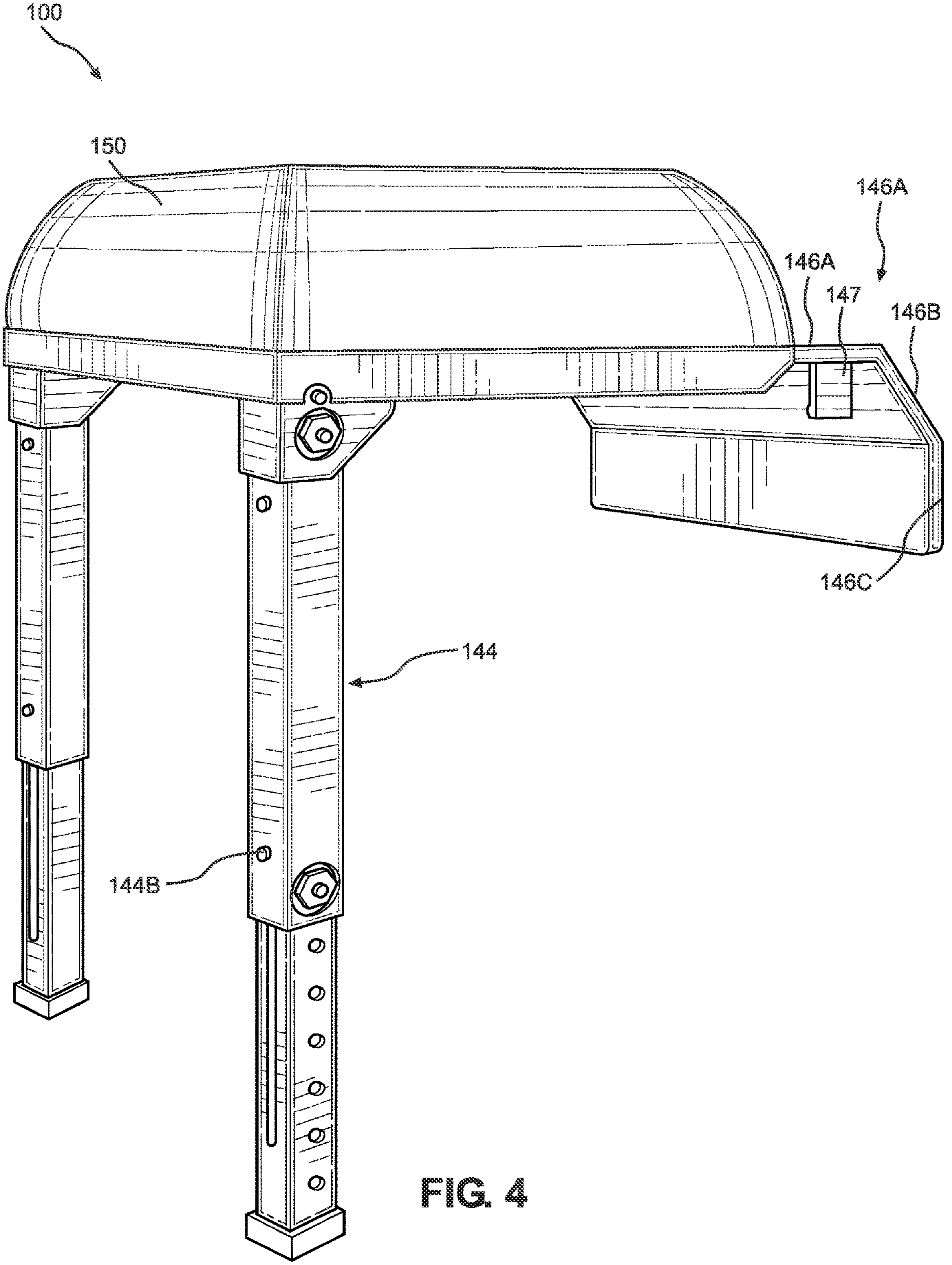
FIG. 4 shows a rear perspective view of an embodiment of a transfer seat platform.

FIG. 4 shows a rear perspective view of an embodiment of a transfer seat platform 100.

The pair of front legs 144 may have an adjustable length via a locking assembly 144B. The extended lip 146 may include 3 planar sections 146A-C that include a first planar section 146A that extends horizontally or approximately 180° degrees, a second planar section 146B that extends downward at approximately 45° degrees, and a third planar section 146C that extends downward at approximately 90° degrees or the like.

Figure 5:
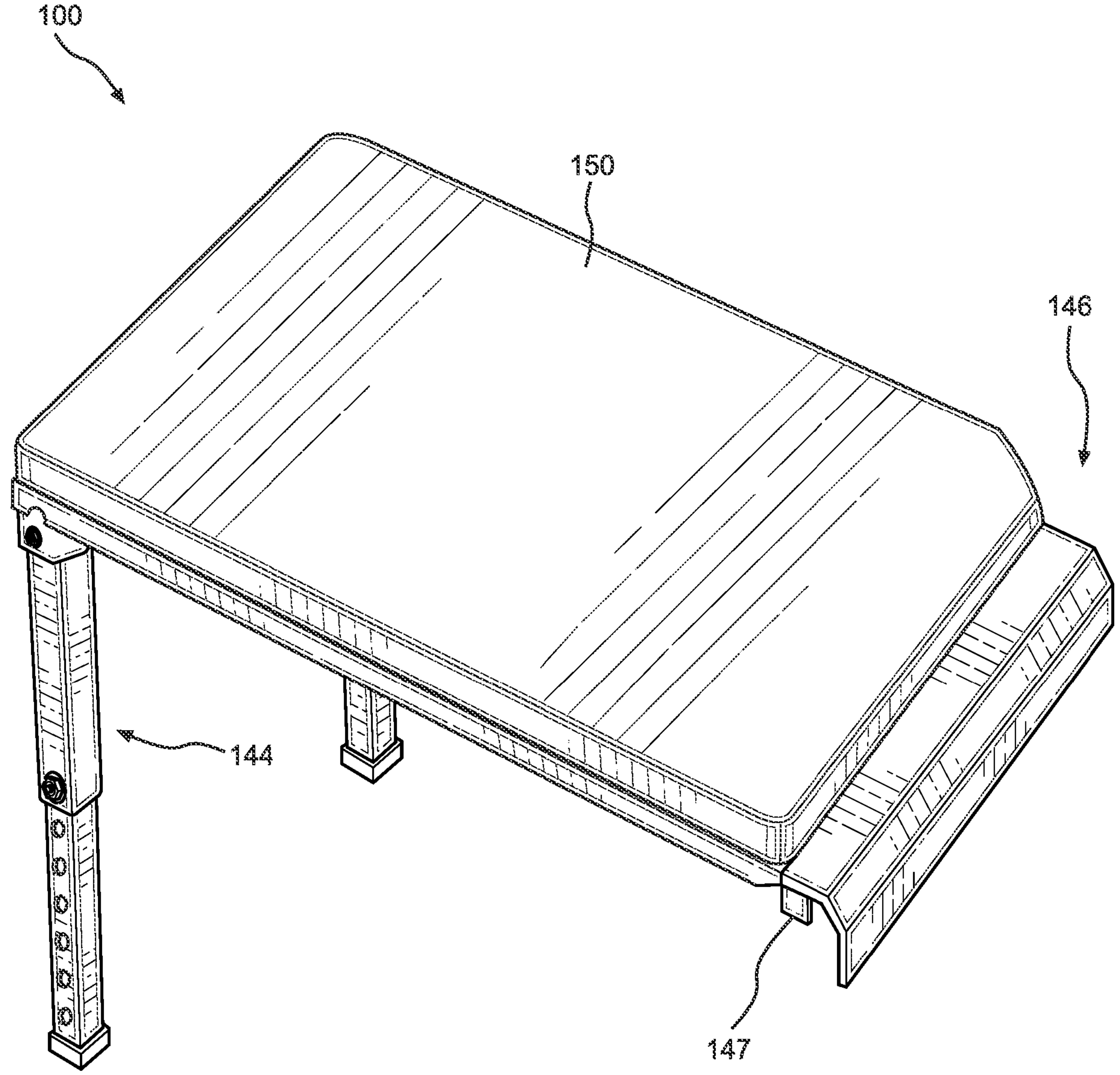
FIG. 5 shows an overhead perspective view of an embodiment of a transfer seat platform.

FIG. 5 shows an overhead perspective view of an embodiment of a transfer seat platform 100.

The pair of front legs 144 may be placed on a ground surface. The extended lip 146 may be placed within the vehicle (FIG. 1, 130). More specifically, the extended lip 146 may be placed within a floorboard of the vehicle (FIG. 1, 130).

Figure 6:
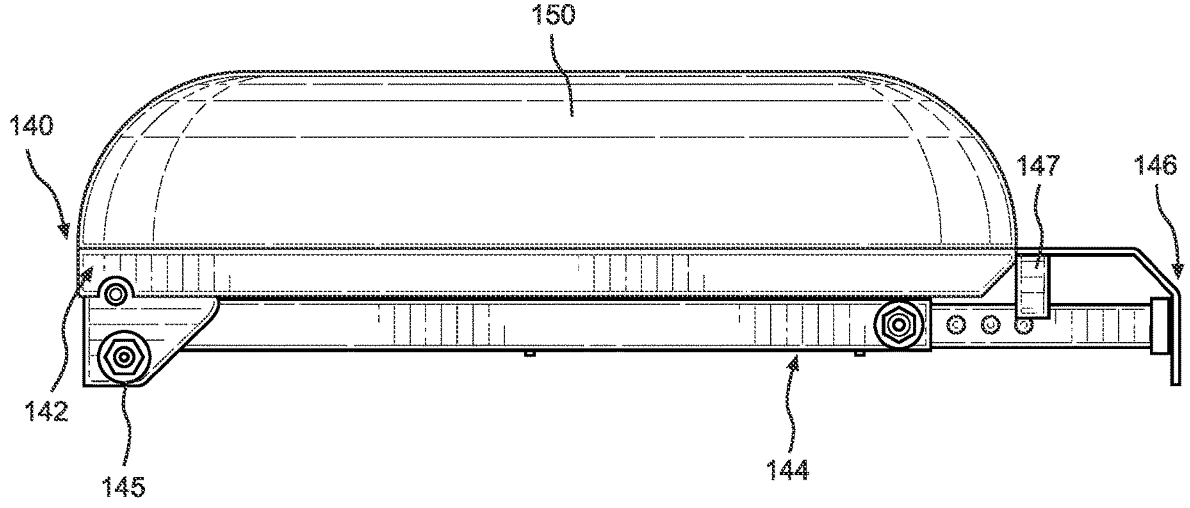
FIG. 6 shows a side perspective view of an embodiment of a transfer seat platform.

FIG. 6 shows a side perspective view of an embodiment of a transfer seat platform 100.

The pair of front legs 144 may be pivotally affixed and folded-up against the top portion 142 of the stand portion 140.

The pair of front legs 144 may each include a hinge 145 disposed on top each of the pair of front legs 144 connected to the bottom of the top portion 142 of the stand portion 140.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transfer seat platform, comprising:

a stand portion having a top portion, a pair of front legs, an extended lip, the top portion includes a front end, a back end, and a bottom portion, the pair of front legs extend from the front end of the top portion of the stand portion and the extended lip extend from the back end of the top portion of the stand portion;

wherein the extended lip includes a first planar section that extends horizontally 180° degrees, a second planar section that extends downward at 45° degrees, and a third planar section that extends downward at 90° degrees; and a cushion disposed and coupled directly on the top portion.

2. The transfer seat platform, according to claim 1, wherein the top portion is a flat planar surface.

3. The transfer seat platform, according to claim 1, wherein the pair of front legs have an adjustable length.

4. The transfer seat platform, according to claim 1, wherein the pair of front legs include a rubber foot disposed on a distal end of each of the pair of front legs to prevent slippage.

5. The transfer seat platform, according to claim 1, wherein the pair of front legs have an adjustable length via a locking assembly.

6. The transfer seat platform, according to claim 1, wherein the pair of front legs are adapted to be placed on a ground surface.

7. The transfer seat platform, according to claim 1, wherein the pair of front legs each include a hinge disposed on top each of the pair of front legs connected to the bottom portion of the top portion of the stand portion.

8. The transfer seat platform, according to claim 1, wherein the extended lip extends outward and downward from the bottom portion of the top portion of the stand portion.

9. The transfer seat platform, according to claim 1, wherein the extended lip includes a downward vertical guide directly adjacent to the top portion of the stand portion to guide the extended lip in place.

10. The transfer seat platform, according to claim 1, wherein the extended lip is placed within the vehicle.

11. The transfer seat platform, according to claim 10, wherein the extended lip is placed within a floorboard of the vehicle.

12. The transfer seat platform, according to claim 1, wherein the stand portion is made of aluminum.

13. The transfer seat platform, according to claim 1, wherein the cushion is made of leather.

14. The transfer seat platform, according to claim 1, wherein the cushion is made of vinyl.

15. The transfer seat platform, according to claim 1, wherein the transfer seat platform is utilized by a handicapped person adapted to utilize a wheelchair and the vehicle without having to lift the handicapped person and physically place them into the vehicle.

16. The transfer seat platform, according to claim 15, wherein the transfer seat platform is positioned between the vehicle and the wheelchair.

17. The transfer seat platform, according to claim 15, wherein the handicapped person can lift themselves from the wheelchair onto the transfer seat platform and then lift themselves from the transfer seat platform and into the vehicle.

18. The transfer seat platform, according to claim 15, wherein the handicapped person receives assistance from one or more other persons to lift themselves from the wheelchair onto the transfer seat platform and then lift themselves from the transfer seat platform and into the vehicle.

* * * * *